US011321743B2

(12) United States Patent
Daly et al.

(10) Patent No.: US 11,321,743 B2
(45) Date of Patent: May 3, 2022

(54) GENERATING RICH MEDIA AD UNITS

(71) Applicant: Augmented Reality Concepts, Inc., Syracuse, NY (US)

(72) Inventors: Devin Daly, Tully, NY (US); Arthur Dessein, Syracuse, NY (US); Andrew Lumsden, Lindon, UT (US); Steven Saporta, Jersey City, NJ (US)

(73) Assignee: AUGMENTED REALITY CONCEPTS, INC., Syracuse, NY (US)

( * ) Notice: Subject to any disclaimer, the term of this patent is extended or adjusted under 35 U.S.C. 154(b) by 0 days.

(21) Appl. No.: 17/025,908

(22) Filed: Sep. 18, 2020

(65) Prior Publication Data

US 2021/0090130 A1    Mar. 25, 2021

Related U.S. Application Data

(60) Provisional application No. 62/903,532, filed on Sep. 20, 2019.

(51) Int. Cl.
*G06Q 30/00* (2012.01)
*G06Q 30/02* (2012.01)

(52) U.S. Cl.
CPC ..... *G06Q 30/0271* (2013.01); *G06Q 30/0242* (2013.01); *G06Q 30/0265* (2013.01); *G06Q 30/0276* (2013.01)

(58) Field of Classification Search
CPC .......... G06Q 30/0271; G06Q 30/0242; G06Q 30/0265; G06Q 30/0276
See application file for complete search history.

(56) References Cited

U.S. PATENT DOCUMENTS

| | | | |
|---|---|---|---|
| 9,412,203 B1* | 8/2016 | Garcia, III | G06T 13/00 |
| 9,865,069 B1 | 1/2018 | Saporta | |
| 10,284,794 B1* | 5/2019 | Francois | G06K 9/46 |
| 10,332,295 B1 | 6/2019 | Saporta | |
| 10,726,451 B1* | 7/2020 | Plankey | H04N 21/854 |
| 10,845,943 B1* | 11/2020 | Ansari | H04N 5/23206 |
| 10,885,099 B1* | 1/2021 | Price | G06K 9/6267 |
| 10,984,503 B1* | 4/2021 | Otten | G06T 7/60 |
| 2008/0228581 A1* | 9/2008 | Yonezaki | G06Q 30/0241 |
| | | | 705/14.4 |

(Continued)

OTHER PUBLICATIONS

MyDealerLot, First RTLS Subscription based Inventory Management Tool for Dealers Introduced, 2006, Business Wire (Year: 2006).*

*Primary Examiner* — Matthew L Hamilton
(74) *Attorney, Agent, or Firm* — Mintz Levin Cohn Ferris Glovsky and Popeo, P.C.

(57) ABSTRACT

An apparatus is provided for generating rich media ad units. The apparatus may be configured to receive an inventory feed and a feature feed. The inventory feed may include a plurality of product identifiers. The feature feed may include a plurality of features, each of the plurality of features being associated with at least one of the plurality of product identifiers. The apparatus may select, based on consumer metrics, a product identifier from the plurality of product identifiers. The apparatus may generate, based on the consumer metrics, a feature subset including a subset of the plurality of features associated with the product identifier. The apparatus may generate, based on the feature subset, a rich media ad unit. Related methods and apparatuses are also provided.

20 Claims, 5 Drawing Sheets

(56) References Cited

U.S. PATENT DOCUMENTS

| | | | | |
|---|---|---|---|---|
| 2014/0067614 A1* | 3/2014 | Hygema | ............ | G06Q 30/0629 |
| | | | | 705/26.63 |
| 2014/0164188 A1* | 6/2014 | Zabawa | ............ | G06Q 30/0625 |
| | | | | 705/26.62 |
| 2015/0371262 A1* | 12/2015 | Anspach | ............ | G06Q 30/0256 |
| | | | | 705/14.54 |
| 2017/0147881 A1* | 5/2017 | Booth | ................ | G06K 9/4671 |
| 2017/0221229 A1* | 8/2017 | Perrier | ............... | G06Q 30/0641 |

* cited by examiner

GENERATING RICH MEDIA AD UNITS

CROSS REFERENCE TO RELATED APPLICATIONS

This application is related to U.S. Provisional Patent Application No. 62/903,532 filed Sep. 20, 2019, entitled "GENERATING RICH MEDIA AD UNITS."

TECHNICAL FIELD

The subject matter described herein relates generally to the generation of rich media files.

BACKGROUND

Rich media files may include text, images, video, and sound. A rich media file may also include references to other files, for example, on the Internet. A rich media ad unit is an example of a rich media file.

SUMMARY

Systems, methods, and articles of manufacture, including computer program products, are provided for generating rich media ad units.

In some example embodiments, there is provided an apparatus that includes at least one processor and at least one memory. The at least one memory may include program code that provides operations when executed by the at least one processor. The operations may include: receiving an inventory feed and a feature feed, the inventory feed including a plurality of product identifiers, the feature feed including a plurality of features, each of the plurality of features being associated with at least one of the plurality of product identifiers; selecting, based on consumer metrics, a product identifier from the plurality of product identifiers; generating, based on the consumer metrics, a feature subset including a subset of the plurality of features associated with the product identifier; and generating, based on the feature subset, a rich media ad unit.

In some variations, one or more features disclosed herein, including the following features, can optionally be included in any feasible combination. The operations may further include delivering the rich media ad unit to an ad serving platform.

In some variations, generating the rich media ad unit may further include: including, in the rich media ad unit, a 360 spin and/or one or more feature cards, each of the one or more feature cards including a reference to an associated media object, the associated media object including a still image, a video and/or a textual description of at least one feature included in the feature subset.

In some variations, the operations may further include: receiving a spin feed including a plurality of 360 spins, each of the plurality of 360 spins being associated with at least one of the plurality of product identifiers included in the inventory feed; and selecting, based on the spin feed, the 360 spin to include in the rich media ad unit.

In some variations, selecting the product identifier may further include: producing, based on the inventory feed, a set of candidate product identifiers; obtaining, based on the set of candidate product identifiers, a plurality of candidate features; determining that at least one of the plurality of candidate features matches a feature indicated by the consumer metrics; and selecting, in response to the determining, the product identifier from the set of candidate product identifiers.

In some variations, selecting the product identifier may further include: obtaining a product category associated with each of the plurality of product identifiers; determining that the product category matches a product category indicated by the consumer metrics; and selecting, in response to the determining, the product identifier from the plurality of product identifiers.

In some variations, the plurality of product identifiers may include a plurality of vehicle identification numbers, and obtaining a product category associated with each of the plurality of product identifiers may include determining, based on a vehicle identification number from the plurality of vehicle identifiers, a year, make, model, and/or vehicle type associated with the vehicle identification number.

In some variations, the operations may further include: receiving a feature catalog including a plurality of features, each of the plurality of features being associated with at least one of the plurality of product identifiers; searching, based on the consumer metrics, the feature catalog to generate a candidate feature list; and prioritizing, based on the consumer metrics, the candidate feature list to generate a prioritized feature list, wherein generating the feature subset may include selecting, from the prioritized feature list, the subset of the plurality of features associated with the product identifier.

In some variations, the rich media ad unit may further include a user interface template including a pixel width of the rich media ad unit, a pixel height of the rich media ad unit, and a layout, the layout including an indication of a logo region, an indication of a spin region, and/or one or more indications of feature card regions.

In some variations, generating the rich media ad unit may further include: in response to determining, based on a client configuration record, that 360 spins are disabled, excluding the 360 spin from the rich media ad unit.

In some variations, generating the rich media ad unit may further include: in response to determining, based on a client configuration record, that feature cards are disabled, excluding the one or more feature cards from the rich media ad unit.

In another aspect, there is provided a method for generating rich media ad units. The method may include receiving, at a processing engine, an inventory feed and a feature feed, the inventory feed including a plurality of product identifiers, the feature feed including a plurality of features, each of the plurality of features being associated with at least one of the plurality of product identifiers; selecting, by the processing engine and based on consumer metrics, a product identifier from the plurality of product identifiers; generating, by the processing engine and based on the consumer metrics, a feature subset including a subset of the plurality of features associated with the product identifier; and generating, by the processing engine and based on the feature subset, a rich media ad unit.

In some variations, the method may further include delivering, by the processing engine, the rich media ad unit to an ad serving platform.

In some variations, generating the rich media ad unit may include: including, in the rich media ad unit, a 360 spin and/or one or more feature cards, each of the one or more feature cards including a reference to an associated media object, the associated media object including a still image, a video, and/or a textual description of at least one feature included in the feature subset.

In some variations, the method may further include: receiving, at the processing engine, a spin feed including a plurality of 360 spins, each of the plurality of 360 spins being associated with at least one of the plurality of product identifiers included in the inventory feed; and selecting, by the processing engine and based on the spin feed, the 360 spin to include in the rich media ad unit.

In some variations, selecting the product identifier may further include: producing, by the processing engine and based on the inventory feed, a set of candidate product identifiers; obtaining, by the processing engine and based on the set of candidate product identifiers, a plurality of candidate features; determining, by the processing engine, that at least one of the plurality of candidate features matches a feature indicated by the consumer metrics; and selecting, by the processing engine and in response to the determining, the product identifier from the set of candidate product identifiers.

In some variations, selecting the product identifier may further include: obtaining, by the processing engine, a product category associated with each of the plurality of product identifiers; determining, by the processing engine, that the product category matches a product category indicated by the consumer metrics; and selecting, by the processing engine and in response to the determining, the product identifier from the plurality of product identifiers.

In some variations, the plurality of product identifiers may include a plurality of vehicle identification numbers, and obtaining a product category associated with each of the plurality of product identifiers may include determining, based on a vehicle identification number from the plurality of vehicle identification numbers, a year, make, model, and/or vehicle type associated with the vehicle identification number.

In some variations, the method may further include: receiving, at the processing engine, a feature catalog including a plurality of features, each of the plurality of features being associated with at least one of the plurality of product identifiers; searching, by the processing engine and based on the consumer metrics, the feature catalog to generate a candidate feature list; and prioritizing, by the processing engine and based on the consumer metrics, the candidate feature list to generate a prioritized feature list, wherein generating the feature subset may include selecting, from the prioritized feature list, the subset of the plurality of features associated with the product identifier.

In another aspect, there is provided an apparatus configured to generate an interactive, rotatable 360 presentation of a product. The apparatus includes at least one processor and at least one memory. The at least one memory may include program code that provides operations when executed by the at least one processor. The operations may include: obtaining information about a plurality of images of a product; obtaining, in response to obtaining the information about the plurality of images, the plurality of images of the product; rearranging the plurality of images into at least one sequence, the at least one sequence including ordered images from a plurality of viewing angles of the product distributed around 360 degrees, the plurality of images being rearranged into the at least one sequence by at least: selecting images from the plurality of images that correspond to an exterior view of the product for inclusion in a first sequence of the at least one sequence, and selecting images from the plurality of images that correspond to an interior view of the product for inclusion in a second sequence of the at least one sequence; adding at least one hotspot to at least one image of the at least one sequence, the at least one hotspot being associated with a separate media element and enabling access to the separate media element when selected by a viewer of the at least one sequence; merging the ordered images of the at least one sequence into at least one 360-degree view of the product; and merging the at least one 360-degree view of the product into the 360 spin.

In some variations, rearranging the plurality of images into the at least one sequence may further include determining an order for the images based on predetermined information corresponding to the product.

In some variations, adding the at least one hotspot to the at least one image may further include determining a position for the at least one hotspot on the at least one image based on predetermined information corresponding to the product.

Implementations of the current subject matter may include methods consistent with the descriptions provided herein as well as articles that may comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to generating rich media ad units, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
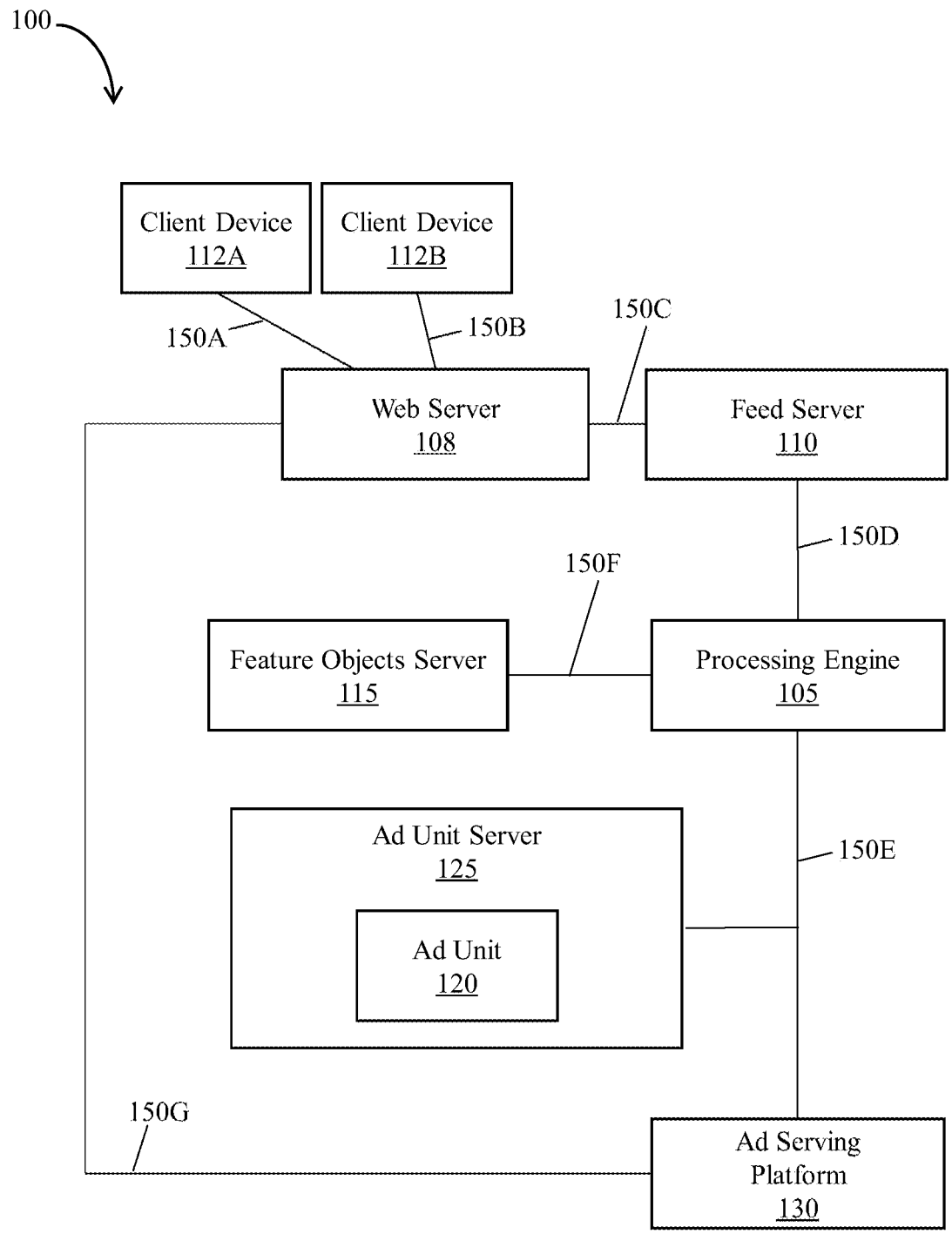
FIG. 1 depicts a system diagram illustrating an example of a system for generating rich media ad units, in accordance with some example embodiments.

Some businesses, for example, automotive dealers, may want to use rich media ad units to advertise their products to potential and/or existing customers, allowing their potential and/or existing customers to see more of the product than what they might otherwise see using a simple still image. As used herein, a potential and/or an existing customer may be referred to simply as a consumer. Creating a rich media ad unit can be a complex process, and one that is not readily performed by some businesses. There is, therefore, a need for an automated system and/or process to create rich media ad units for a product.

The rich media ad unit may include one or more multimedia objects, such as text, audio recordings, still images, videos, and/or the like. As used herein, a rich media ad unit may be referred to as an ad unit. Another class of multimedia objects is an interactive, rotatable 360-degree presentation of an object. An example of an interactive, rotatable, 360-degree presentation of an object may be found in U.S. Pat. Nos. 9,865,069 and 10,332,295, which is incorporated herein by reference in its entirety. As used herein, an interactive, rotatable, 360-degree presentation may be referred to as a 360 spin. A 360 spin may include one or more image sequences, one or more hotspots, text, and still images. The 360 spin may be formatted as a file, such as a JavaScript Object Notation (JSON) file, an Extensible Markup Language (XML) file, a comma-separated value (CSV) file, and/or the like. The 360 spin may provide a spin or rotation of the product. From the perspective of the viewer, such as the consumer, the product rotates as if the consumer were walking around the product. The 360 spin is interactive in the sense that the 360 spin is controlled, by the consumer, via a user interface of a processor-based device. The processor-based device may comprise or be comprised in a smart phone or other types of processor-based devices, such as computers, laptops, etc. The processor-based device may include a viewer application that may be used by the consumer to display and/or interact with the 360 spin.

The 360 spin may include one or more hotspots. Each hotspot may include an icon, one or more coordinates, and a reference to a video or a still image close-up of a feature of the product. When the 360 spin is displayed, such as in the viewer application, the hotspot may be highlighted and/or identified based on the one or more coordinates. When a user clicks on and/or selects the hotspot, the associated hot spot video and/or still image may be displayed. For example, the hotspots of a 360 spin for a pickup truck may include, and/or be associated with, a video of the operation of the truck's lift gate, an image of the truck bed, and/or a close-up image of the trailer hitch.

In some embodiments, there may be provided systems and methods for automatically generating a rich media ad unit of a product and/or object. The rich media ad unit may include one or more 360 spins of the product. The rich media ad unit may include one or more feature cards. A feature card may refer to a region of the rich media ad unit that is used to display a textual description of a feature, a still image of the feature, a video of the feature, and/or the like.

The system may generate the rich media ad unit based on consumer metrics of an individual consumer. The consumer metrics may identify products, product categories, features, and/or feature categories of a product the consumer is (or is not) interested in. To illustrate further, Alice, a prospective customer, has been known to click on ad units for sports cars. When Alice is looking at a 360 spin, she may sometimes look at hotspots of various features, including the navigation unit, the entertainment system, the instrument cluster, and the engine. The system may gather the consumer metrics based on Alice's current and past interactions with ad units, including tracking her likes and dislikes. The system may use Alice's consumer metrics to create the rich media ad unit specifically for Alice. The Alice-specific ad unit may include 360 spins of a sports car that is in a vehicle dealer's inventory. Each Alice-specific ad unit may include one or more feature cards with close-ups of the features Alice has shown an interest in. For example, the Alice-specific ad unit may include feature cards for the navigation system, the entertainment system, and the engine.

The system may send the ad unit to an ad serving platform, which may include a web server, an eCommerce platform, an ad retargeting platform, and/or the like. Examples of the ad serving platform or the ad retargeting platform include Mailchimp, Criteo, Google AdSense and/or the like. When a consumer visits a web page that supports the ad serving platform, the ad serving platform may capture tracking information that can be used to recognize the consumer. The tracking information may include a cookie identifier of a cookie stored in a browser, a serial number of the viewer application, an email address, and/or the like. The ad serving platform may, in response to recognizing the tracking information associated with the consumer, request, receive, and serve a targeted ad unit for that consumer. The ad unit may include references to other objects and/or files, for example, on the Internet. For example, the ad unit may include one or more uniform resource locators (URLs) of 360 spins, other multimedia objects, files, and/or the like. The ad unit may be stored as a JSON-formatted file, a CSV-formatted file, an XML-formatted file, and/or the like.

FIG. 1 depicts a diagram illustrating an example of a system 100 for generating the rich media ad unit, in accordance with some example embodiments. The system may include one or more client devices 112A-112B, which may include computers, laptops, smart phones, and/or other processor-based devices. The consumer may use the client device 112A to view and/or interact with the ad unit, search for a product, browse a product inventory, and/or the like. The client device 112A may include an application, such as a web browser, a smartphone application, a viewer application, and/or the like. The client device 112A may obtain the viewer application and/or the viewer plugin from a web server 108, an app store, and/or the like. The viewer application may include a dedicated viewer application, a web browser that includes the viewer plugin, and/or the like. The client device 112A may send, to the web server 108, a request. The client device 112A may receive, from the web server 108, a result, and display the result at the user interface. The consumer may use the client device 112A, including the viewer application, to view and/or interact with the ad unit. The client device 112A and/or the web server 108 may collect the consumer metrics based on the consumer's interactions with the ad unit. The consumer metrics may identify products, product categories, features, and/or feature categories of products the consumer may be (or may not be) interested in. For example, the consumer metrics may be updated each time the consumer clicks on and/or accesses a hotspot, each time the consumer selects a particular view of a 360 spin, and/or the like. The client device 112A and/or the web server 108 may send the consumer metrics and/or the tracking information to a feed server 110, a processing engine 105, an ad unit server 125, an ad serving platform 130, and/or the like. The client device 112A may include the consumer metrics and/or the tracking information along with the request sent to the web server 108.

The web server 108 may be configured to receive the request from the client device 112A, generate content that satisfies the request, and send the content to the client device 112A. The web server 108 may couple to the ad serving platform 130, which may be configured to provide the ad unit to the web server 108. The web server 108 may receive the ad unit from the ad serving platform 130 and include the ad unit in the content it sends to the client device 112A. The web server 108 may further couple to the feed server 110 which may be configured to provide product information, inventory information, media files, and/or the like to the web server 108. The web server 108 may send, to the feed server 110, a consumer search request. The consumer search request may include a request for product information, inventory information, media files, and/or the like. In response to the consumer search request, the web server 108 may receive, from the feed server 110, a consumer search result. The consumer search result may include the requested product information, inventory information, media files, and/or the like. The web server may include, in the content it sends to the client device 112A, at least some of the information in the consumer search result. The web server 108 may include a computer, a cloud computing device, an Internet-of-Things (IoT) appliance, and/or other processor-based device.

The feed server 110 may be configured to receive a consumer search request from the web server 108, process the consumer search request, and send a consumer search result to the web server 108. The feed server 110 may couple to the processing engine 105, which may be configured to generate the 360 spins and/or the ad unit. The feed server 110 may send, to the processing engine 105, inventory information, product information, feature information, media files, 360 spins, and/or the like. The feed server 110 may also send, to the processing engine 105, the consumer metrics, the consumer search request, the consumer search result, and/or the like. The feed server 110 may include a computer, a cloud computing device, an Internet-of-Things (IoT) appliance, and/or other processor-based device.

The processing engine 105 may be configured to generate the 360 spins and/or the ad unit. The processing engine 105 may receive, from the feed server 110, a request to generate the ad unit. The processing engine 105 may further receive, from the feed server 110, inventory information, product information, feature information, media files, and/or the like. The processing engine 105 may further receive, from the feed server 110, the consumer metrics, the consumer search request, the consumer search result, and/or the like. The processing engine 105 may couple to the feature objects server 115, which may be configured to provide, to the processing engine 105, manufacturer information, product information, feature information, media files and/or the like. The processing engine 105 may further couple to the ad serving platform 130, which may be configured to send, to the processing engine 105, a request to generate the ad unit. Based on the information and/or request received from the feed server 110, the feature objects server 115, the ad serving platform 130, and/or the like, the processing engine 105 may generate the ad unit. The processing engine 105 may further couple to the ad unit server 125, which may be configured to receive and store the ad unit. Upon generating the ad unit, the processing engine 105 may send the ad unit 120 to the ad unit server 125, and send, to the ad serving platform 130, an indication that the ad unit 120 is available. The processing engine 105 may include a computer, a cloud computing device, an Internet-of-Things (IoT) appliance, and/or other processor-based device.

The feature objects server 115 may be configured to provide, to the processing engine 105, a feature catalog including manufacturer information, product information, feature information, media files and/or the like. The feature catalog may be included in a content library. The content library may include feature catalogs from various manufacturers, original equipment manufacturers (OEMs), third parties, and/or the like. The feature objects server 115 may include a computer, a cloud computing device, an Internet-of-Things (IoT) appliance, and/or other processor-based device.

The ad unit server 125 may be configured to receive, store, and/or serve the ad unit 120. The ad unit server 125 may couple to the ad serving platform 130, which may be configured to distribute the ad unit 120 to the web browser 108. In response to receiving the ad unit 120, the ad unit server 125 may send, to the ad serving platform 130, and indication that the ad unit 120 is available for distribution. The ad unit server 125 may include a computer, a cloud computing device, an Internet-of-Things (IoT) appliance, and/or other processor-based device.

The ad serving platform 130 may be configured to serve the ad unit 120 to web servers, search engines, and/or the like. The ad serving platform 130 may receive, from the web server 108, the tracking information for the consumer. In response, the ad serving platform 130 may send, to the processing engine 105, a request to generate the ad unit 120. The ad serving platform 130 may receive, from the processing engine 105, the indication that the ad unit 120 is available. Alternatively and/or additionally, the ad serving platform 130 may receive the indication from the ad unit server 125. In response to receiving the indication, the ad serving platform 130 may obtain, from the ad unit server 125, the ad unit 120 and send it to the web server 108 to be included in the content sent to the client device 112A. The ad serving platform 130 may include a computer, a cloud computing device, an Internet-of-Things (IoT) appliance, and/or other processor-based device.

The components depicted at FIG. 1 may be coupled via wired and/or wireless network links 150A-150G. The network links 150A-150G may be part of a local area network (LAN), a wireless local area network (WLAN), a public land mobile network (PLMN), the Internet, and/or the like.

The wireless local area network may operate in accordance with Institute of Electrical and Electronics Engineers (IEEE) 802.11, 802.16, and/or the like.

The wired local area network may operate in accordance with Ethernet, IEEE 802.1 and/or the like.

The public land mobile network may operate in accordance with Global System for Mobile communications (GSM), General Packet Radio Service (GPRS), universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications—Advanced (IMT-A) systems standards, and/or the like.

As noted, the feed server 110 may be configured to provide information to the processing engine 105. The feed server 110 may provide, to the processing engine, inventory information, product information, feature information, digital media files, 360 spins, the consumer search request, the consumer search result, the consumer metrics, and/or the like. The feed server 110 may include an inventory management system, a media file database, a 360 spin database, a feature database, a product database, a customer database, and/or the like. The feed server 110 may use the data from these databases to generate the information provided to the processing engine 105. The feed server 110 may provide at least some of the information in the form of feed files. The feed files may include an inventory feed, a product feed, a feature feed, a spin feed, and/or the like. The inventory feed, product feed, feature feed, and/or spin feed may be combined to form a single feed file. Alternatively and/or additionally, at least one of the inventory feed, product feed, feature feed, and/or spin feed may be separate feed file(s). The feed server 110 may be owned and/or operated by a feed service provider, a client organization, a retailer, a vehicle dealer, an inventory management service, an Internet service provider, a third party, and/or the like.

The feed server 110 may be configured to provide an inventory feed to the processing engine 105. The inventory feed may include information about one or more products included in an inventory of products managed by the feed server 110. The inventory feed may include product identifiers, product names, manufacturer names, product prices, retailer identifiers, and/or the like. Table 1 depicts an example of the inventory feed.

TABLE 1

Example inventory feed from feed server 110

| Dealer | VIN | Stock No. | ListPrice | Description |
|---|---|---|---|---|
| 7763 | 3D7UT2CL0BG625027 | CE308238 | 20559 | 2018 Dodge Ram |
| 7763 | WBA3A5C57CF256651 | CE308238 | 32000 | 2019 BMW 328i |
| 7763 | KNAFT4A22D5675895 | CE325353 | 18755 | 2020 KIA Forte |

The feed server 110 may be further configured to provide the feature feed to the processing engine 105. The feature feed may include a description of one or more features associated with each of the product identifiers found in the inventory feed. The feature feed may include product names, product identifiers, feature names, feature identifiers, and/or the like. Table 2 depicts an example of the feature feed.

TABLE 2

Example feature feed from feed server 110

| VIN | Feature |
|---|---|
| WBA3A5C57CF256651 | Adaptive cruise control |
| WBA3A5C57CF256651 | Fog lights |

TABLE 2-continued

Example feature feed from feed server 110

| VIN | Feature |
|---|---|
| WBA3A5C57CF256651 | 19 inch alloy rims |
| WBA3A5C57CF256651 | GPS navigation unit |

The feed server 110 may be further configured to provide the spin feed to the processing engine 105. The spin feed may identify one or more 360 spins associated with the product identifiers included in the inventory feed. The spin feed may include a URL for each 360 spin, indicating a web location for the 360 spin file, such as a JSON file, an XML file, a CSV file, and/or the like. The processing engine 105 may obtain, from the spin feed, the URLs of one or more 360 spins associated with a product identifier included in the inventory feed. To continue with the example of a vehicle dealer, the feed server 110, the vehicle dealer may generate the 360 spins for one or more vehicles in inventory and include the 360 spins in the spin feed sent to the processing engine 105, as depicted in the example of Table 3.

TABLE 3

Example spin feed from feed server 110

| VIN | Spin URL |
|---|---|
| 3D7UT2CL0BG625027 | http://xyz.com/spins/25027 |
| WBA3A5C57CF256651 | http://xyz.com/spins/56651 |
| KNAFT4A22D5675895 | http://xyz.com/spins/75895 |

Alternatively and/or additionally, the 360 spins for a product may be included in a feed file other than the spin feed. For example, the 360 spins may be included in the inventory feed, the feature feed, and/or the like.

Alternatively and/or additionally, the processing engine 105 may generate the 360 spins based on the feed files received from the feed server 110.

The processing engine 105 may generate the rich media ad unit based at least in part on the information received from the feed server 110, including the inventory feed, the feature feed, the spin feed, the consumer search request, the consumer search result, the consumer metrics, and/or the like.

The feature objects server 115 may provide a feature catalog to the processing engine 105. The feature catalog may include a list of features that are available for specific products and/or manufacturers. Table 4 depicts an example of a feature catalog provided by the feature objects server 115. As shown in Table 4, the records of a feature catalog may include the year, make, and model of a vehicle, one or more features that are available for each vehicle, and a reference to an image of each feature. The reference may include a URL that identifies an image file at an image server or image database. The processing engine 105 generate the 360 spins and/or the ad unit 120 based at least in part on the contents of the feature catalog received from the feature objects server 115.

TABLE 4

| Example Feature Catalog for Feature objects server 115 | | | | |
| --- | --- | --- | --- | --- |
| Feature | Year | Make | Model | URL |
| Adaptive cruise | 2018 | Honda | Civic | http://xyz.com/cruise/civic2018.jpg |
| Adaptive cruise | 2019 | Honda | Civic | http://xyz.com/cruise/civic2019.jpg |
| 18 inch alloy rims | 2018 | Honda | Civic | http://xyz.com/alloy18/civic2018.jpg |
| 19 inch alloy rims | 2018 | Honda | Civic | http://xyz.com/alloy19/civic2018.jpg |

The feature catalog may be implemented as a feature-centric catalog. The feature-centric catalog may be searchable by manufacturer-specific feature identifiers, product-specific feature identifiers, and/or the like. As used herein, manufacturer-specific feature identifiers and product-specific feature identifiers may refer to manufacturer-specific feature names, product-specific feature names, feature descriptions, feature numbers, and/or the like. To find products features in a feature-centric database, the processing engine 105 may search the feature catalog for the feature identifier. Alternatively and/or additionally, the feature catalog may be implemented as a product-centric catalog. The product-centric feature catalog may be searchable by a manufacturer identifier, a product identifier, and/or the like. To find features in a product-centric catalog, the processing engine 105 may obtain a list of features for the product by searching for the manufacturer name, manufacturer identifier, product name, product identifier, and/or the like. The feature centric catalog may be considered a more efficient schema for searching for features. The feature-centric catalog may include a core set of generic feature names. The generic feature names may be associated with nodes that identify specific manufacturers, specific products, manufacturer-specific features, product-specific features, and/or the like.

To continue with the vehicle example, to find a feature in a product-centric catalog, the processing engine 105 may search the catalog for the year, make, and model of a vehicle to obtain a list of features associated with the vehicle. In a feature-centric catalog, the processing engine 105 may search the catalog for a generic feature name to obtain a list of manufacturers and/or vehicles that include a feature that maps to the generic feature name.

The processing engine 105 may use the feature-centric catalog, along with keyword matching algorithms, natural language processing techniques, and/or the like to identify manufacturer-specific feature identifiers and/or product-specific feature identifiers. The manufacturer-specific feature identifiers and/or product-specific feature identifiers may be based on generic feature names that appear in the feed files received from the feed server 110. The processing engine 105 may use a lookup table to convert from a manufacturer-specific feature identifier and/or a product-specific feature identifier to a generic feature name. As used herein, the conversion from a manufacturer-specific feature identifier and/or a product-specific feature identifier to a generic feature name may be referred to as aggregation, feature aggregation, and/or the like. To continue with the vehicle example, the lookup table for vehicle features may include the manufacturer, model, year, a manufacturer-specific feature identifier, and a generic feature name. The processing engine 105 may search the lookup table for a manufacturer-specific feature identifier and/or a product-specific feature identifier to obtain the equivalent generic feature name. The processing engine 105 may use the generic feature name to search the feature catalog to obtain a media object for the feature. As each media object is found, the processing engine 105 may include the media object in a list of candidate media objects. The processing engine may generate the ad unit 120 based at least in part on the list of candidate media objects.

The processing engine 105 may use information from the consumer metrics to determine, for a particular consumer, the ad unit 120 to be generated. The consumer metrics may identify one or more manufacturers, one or more products, and/or one or more features the consumer has expressed, indicated, and/or implied interest in. The consumer may express, indicate, and/or imply an interest by clicking on and/or viewing (such as via the user interface provided by the web browser, the viewer application, or other application) a product, a manufacturer, and/or feature. Alternatively and/or additionally, the consumer may express, indicate, and/or imply an interest by searching for a product, manufacturer, feature, and/or the like. Based on the consumer metrics, the processing engine 105 may generate a list of products, features, and/or manufacturers similar to those indicated by the consumer metrics. When the processing engine 105 may determine, based on the feed files, the consumer metrics and/or the list of similar products, features, and/or manufacturers, that a product identifier matches at least one consumer metric. In response to determining that the product identifier matches the at least one consumer metric, processing engine 105 may include that product identifier in a list of candidate product identifiers.

To continue with the vehicle example, the consumer metrics may be associated with one or more vehicle identification numbers. The processing engine 105 may obtain the vehicle identification numbers from the feed files. Based on the vehicle identification numbers, the processing engine 105 may generate a vehicle list about which the consumer has previously shown interest in. The vehicle list may include vehicle information for each vehicle, such as year, make, model, vehicle type, and/or the like. The vehicle type may include various types and/or categories of vehicles, including sports car, sedan, coupe, convertible, sport utility vehicle, truck, and/or the like. The processing engine 105 may use the vehicle list to produce a list of similar vehicles. The list of similar vehicles may be based on a list of vehicles in a dealer's inventory, based on the consumer search result received from the feed server 110, and/or the like. If the processing engine 105 determines that a vehicle in the vehicle list or the similar vehicle list matches a vehicle in the consumer metrics, the processing engine 105 may include that vehicle in a list of candidate vehicles.

The processing engine 105 may prioritize the list of candidate product identifiers to determine which ad unit to generate. The processing engine 105 may obtain, based on the feed files and based on the feature catalog, a list of the features associated with each product identifier included in the list of candidate product identifiers. If one or more features in the list match features indicated by the consumer metrics, the processing engine 105 may increase a score associated with that product identifier. The processing engine 105 may rank the product identifiers based on the assigned scores. The processing engine 105 may select the product identifier with the highest score and generate the ad unit 120 for that product.

After producing the ad unit 120, the processing engine 105 may send the ad unit 120 to the ad serving platform 130. As noted, the ad serving platform 130 may send the ad unit 120 to the web server 108 to be included in the content sent to the client devices 112A-112B.

The deployment of the web server 108, the feed server 110, the processing engine 105, the feature objects server 115, the ad unit server 125, and/or the ad serving platform 130 may include a remote and/or cloud-based deployment in which these elements are accessed via the network 150A-150G. Alternatively, at least a portion of the functionalities associated with these elements may be deployed locally as software, hardware, or a combination thereof, at another element, including the web server 108, the feed server 110, the processing engine 105, the feature objects server 115, the ad unit server 125, and/or the ad serving platform 130.

Before describing an example process for creating the ad unit 120, the following describes an example process for generating an interactive, rotatable 360-degree presentation (e.g., a 360 spin) of a product or object. As noted, the ad unit 120 may include one or more interactive, rotatable 360-degree presentations of the product or object.

To generate a 360 spin of an object, or product, the processing engine 105 may obtain data describing the object from the feed server 110. The data may include information about a plurality of images of the object to be obtained and converted into the 360 spin of the object, as well as additional information about the object. The processing engine 105 may automatically obtain the plurality of images of the object and rearrange the plurality of images into at least one sequence. The processing engine 105 may obtain the plurality of images of the object from the feed server 110, the web server 108, and/or another source. Alternatively and/or additionally, the processing engine 105 may obtain a video of the object, in which case the processing engine 105 may extract the plurality of images of the object from the video. The at least one sequence may include ordered images from a plurality of viewing angles of the object substantially evenly distributed around 360 degrees. The processing engine 105 may automatically determine whether to add at least one hotspot to at least one image of the at least one sequence. The at least one hotspot may include an element associated with a separate media element that enables access to the separate media element when the hotspot is selected by a viewer of the 360 spin of the object. The viewer may include a smartphone application, a browser plug-in, a desktop application, and/or the like. The viewer may include an application, or may be included in an application, running on the client device 112A. If the processing engine 105 determines that the at least one hotspot is to be added to the at least one sequence, the processing engine 105 may automatically add the at least one hotspot to the associated image(s). The processing engine 105 may merge the ordered images of the at least one sequence into at least one 360-degree view of the object. The processing engine 105 and may merge the at least one 360-degree view of the object into a 360 spin of the object.

The client organization, such as the retailer, vehicle dealer, and/or the like, may use the services of a service bureau known as feed provider. The feed provider may store and/or transmit data about the client organization's products, such as an inventory of vehicles for a vehicle dealer. The data about the client organization's products may include digital photos uploaded, by the client organization, to a web server and/or image server. In the case of a vehicle dealer, the feed provider may generate vehicle data for that particular dealer. The data about the products may include links to downloadable copies of the photos. The vehicle data may be available in the form of a feed file. The processing engine 105 may periodically receive updated feed files from the feed server 110 for the particular client organization.

The feed file may include one or more URLs, each of which indicates a location of one or more images and/or videos of the object.

A client configuration record may include configuration information for a particular client organization (e.g., a vehicle dealer). The client configuration record may include a definition of a particular sequence in which the exterior, interior, and other (e.g., close-up) images, provided by the client organization via the feed file, are arranged. The particular sequence may be defined using sequence strings, which specify the order of photos for either the exterior view, the interior view, or close-up images. Each sequence string follows a sequence grammar, an example of which is described below. A sequence string may consist of one or more substrings separated by spaces, for example. The example of Table 5 depicts examples of a substring formats.

TABLE 5

| Example Sequence Grammar | |
| --- | --- |
| Substring | Interpretation |
| N | The nth photo |
| :n | The first through the nth photo |
| n: | The nth photo through the last photo |
| m:n | The mth photo through the nth photo |

The sequences may be modified by qualifiers, such as "~" and "–". A tilde (~) may mean to reverse a sequence. For example, "~m:n" may represent the nth through the mth photo. A minus sign (–) may mean to count from the end of the sequence. For example, "–3" could mean the third-to-last photo. This capability may be used when the total number of photos is not known in advance.

Consider a set of photos provided by a client organization. The photo set may consist of images. The following are some example sequences according to the above grammar:
"3 5 6:10"=images 3, 5, 6, 7, 8, 9, 10
"3 5 ~6:10"=images 3, 5, 10, 9, 8, 7, 6
":5"=images 1, 2, 3, 4, 5
"16:"=images 16, 17, 18, 19, 20
"–3:"=images 18, 19, 20

In order to automatically rearrange the plurality of images into the at least one sequence the processing engine 105 may download the images identified by the image URLs in the feed file. Alternatively and/or additionally, the processing engine 105 may download a video file of the object identified by a video URL in the feed file. The processing engine 105 may extract the plurality of images from the video file. A first sequence may be an exterior sequence. The exterior sequence may start with an empty list of images. The processing engine 105 may obtain a sequence string for the images. The sequence string may be stored as part of the client configuration record.

The processing engine 105 may parse the sequence string to obtain the substrings. Starting with the first substring, the processing engine 105 may determine the number of numerical values in the substring. If the substring contains one numerical value, the processing engine 105 may append the substring to a list of indices. If the substring contains two numerical values, the processing engine 105 may parse the substring to obtain the first and second values and further determine whether the substring begins with a character indicating reverse order (for example, a tilde "~"). If the substring does not begin with a character indicating reverse order, the processing engine may append a range of indices to the list in the order found in the substring. If the substring begins with a character indicating reverse order, the processing engine 105 may append the range of indices to the list in the reverse order compared to that found in the substring. The processing engine 105 may repeat this process for each substring in the sequence string. If the substring is the last substring in the sequence string, the processing engine 105 may store the images in the order indicated in the list of indices to produce the exterior sequence of images. The processing engine 105 may repeat this process for other sequences, including an interior sequence, a close-up sequence, and/or the like.

Hotspots may be displayed in the images of a 360 spin to allow the consumer to access additional media elements (e.g., close-up images, text descriptions, URLs, and/or additional 360 spins) associated with specific features of the object. A client organization may want to include the same hotspots to all of their 360-degree presentations. These can be referred to as standard hotspots. Similarly, a client organization may want to include one or more hotspots to apply to all of their 360-degree presentations that meet certain criteria. These can be referred to as conditional hotspots. An example use of a conditional hotspot by a vehicle dealer could be to access a close-up image of the cargo area for all Ford vehicles. The addition of standard hotspots and conditional hotspots to 360-degree presentations is automated, in that a client organization, or other entity on the client organization's behalf, can define standard and conditional hotspots once, and the hotspots are then automatically applied to all applicable 360-degree presentations for that client organization.

To define a standard hotspot, a client organization may indicate a name for the hotspot, an optional text description, optional close-up image, optional URL, and the (x,y) coordinates of the hotspot on each image of the 360-degree presentation in which the hotspot is visible. This information describing the standard hotspot may be stored in the client configuration record. To define a conditional hotspot, a client organization can create a hotspot as if the client organization were creating a standard hotspot, as above. The client organization can then make the hotspot conditional based on certain criteria for a product. For example, in the case of vehicles, the hotspot may be made conditional based on a vehicle's make or model.

The defined standard and conditional hotspots may be automatically applied to a client organization's 360-degree presentations. While processing the client organization's feed file, the processing engine 105 may identify a product identifier. In the case of the vehicle example, the processing engine 105 may identify a Vehicle Identification Number (VIN). The product identifier may identify a product for which a 360-degree presentation is to be created. The processing engine 105 may obtain the standard hotspot data from the client configuration record. The standard hotspot data may be stored as part of the 360-degree view of the product (for example, in a JSON-formatted file). The processing engine 105 may obtain the conditional hotspot data from the client configuration record. The conditional hotspot data may be stored as part of the 360-degree view of the product (e.g., in the JSON formatted file). The present embodiments may obtain additional data regarding the client organization's product (e.g., the vehicle's make and model) from the feed file and store the additional information in (e.g., in the JSON-formatted file). When a viewer application displays the resulting 360-degree presentation, the viewer application may read the standard hotspot data, conditional hotspot data, additional information (e.g., make and model), and/or the like from the 360-degree presentation, such as the JSON-formatted file. As the viewer application displays each image of the 360-degree presentation, hotspot that meets certain criteria may be displayed. For example, if the viewer application determines that a standard hotspot should be visible in the current image, the viewer application may display the standard hotspot in the current image. If the viewer application determines that a conditional hotspot should be visible on the current image, and determines that the product meets the conditions found in the in the conditional hotspot's definition (e.g., vehicle make and model), the viewer application may display the conditional hotspot in the current image.

Figure 2:
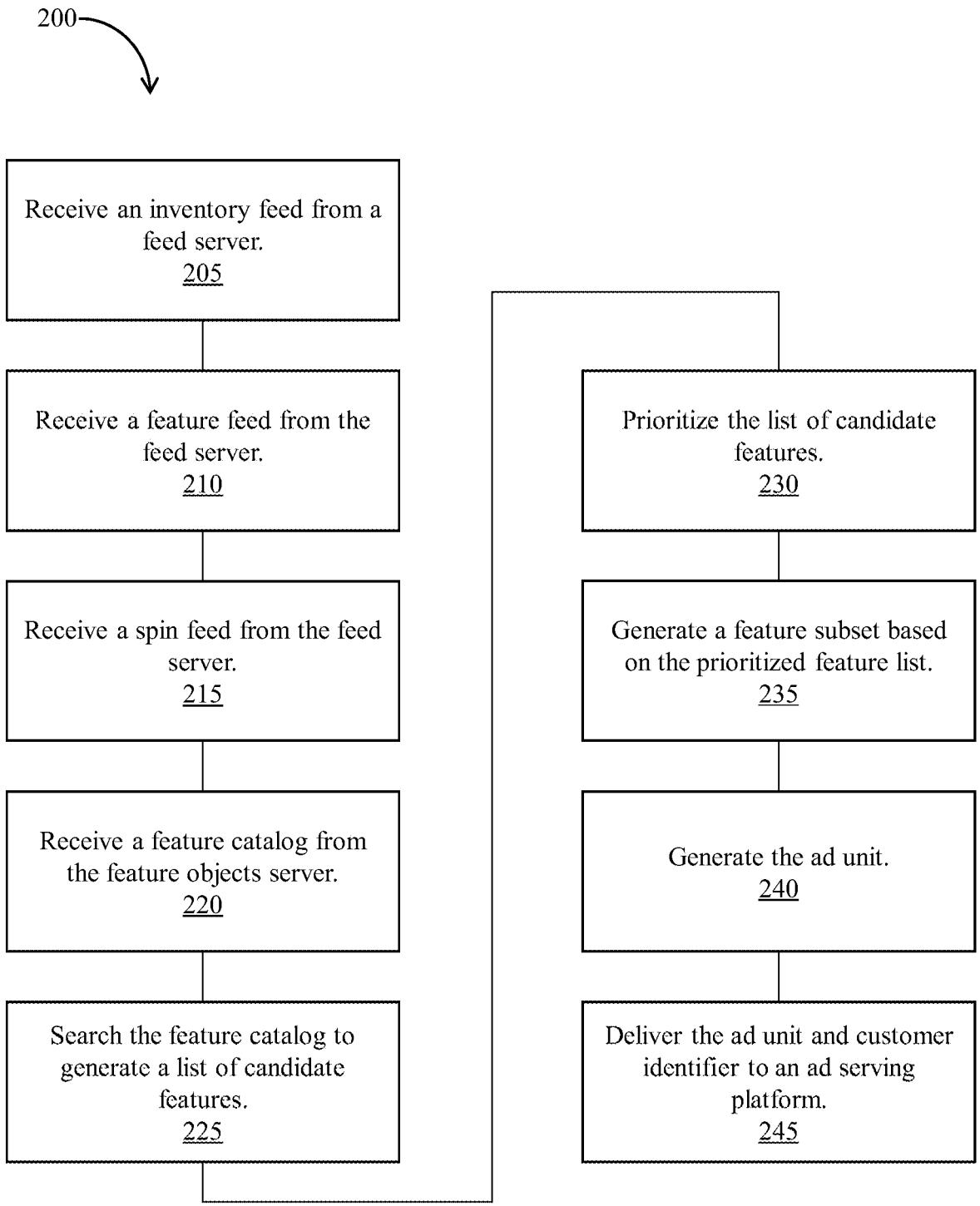
FIG. 2 depicts a flowchart illustrating an example of a process for generating a rich media ad unit, in accordance with some example embodiments.

Returning to the description of generating rich media ad units, FIG. 2 depicts a flowchart illustrating an example of a process for generating the ad unit 120, in accordance with some example embodiments. At 205, the processing engine 105 may receive, from the feed server 110, the inventory feed. The inventory feed may include an identification of one or more products, as described above with respect to the example of Table 1. Each of the one or more products may include, for example, a vehicle.

At 210, the processing engine 105 may receive, from the feed server 110, the feature feed. The feature feed may include a list of products and a list of features associated with each product, as described above with respect to the example of Table 2. The feature feed may be provided by a source other than the feed server 110. For example, the feature feed may be provided by the manufacturer of the product.

At 215, the processing engine 105 may receive, from the feed server 110, the spin feed. The spin feed may include a list of products and a reference to a 360 spin for each product, as described above with respect to the example of Table 3. The reference to the 360 spin may include a uniform resource locator, a network address, a file name, and/or the like. The spin feed may be provided by a source other than the feed server 110. For example, the spin feed may be provided by the manufacturer, a third party, and/or the like.

At 220, the processing engine 105 may receive, from the feature objects server 115, a feature catalog. The feature catalog may include a list of features associated with a product, as described above with respect to the example of Table 4. The feature catalog may include, for each feature, a reference to a media object. The media object may be an image object, a video object, a sound object, a text object, and/or the like. The reference may include a uniform resource locator, a network address, a file name, and/or the like.

At 225, the processing engine 105 may search the feature catalog for one or more features associated with a product to generate a list of candidate features. The processing engine 150 may use lookup tables, keyword search, regular expression search, natural language processing, and/or the like to identify features in the feature catalog that map to the features included in the feature feed. As each feature is identified, the processing engine 105 may add that feature to the list of candidate features.

At 230, the processing engine 105 may produce a prioritized feature list by prioritizing the list of candidate features. The processing engine 105 may prioritize the list of candidate features based on the consumer metrics, sales volume information, product availability information, and/or the like.

The processing engine 105 may apply machine learning techniques to generate the prioritized feature list. For example, the processing engine 105 may be configured to use a recommender system, a collaborative filtering system, a low-rank matrix factorization system, and/or the like to produce the prioritized feature list.

At 235, the processing engine 105 may generate a feature subset based on the prioritized list of features. The feature subset may include references to image objects, video objects, and/or the like. The feature subset may be associated with features that have the highest rank in the prioritized feature list. The processing engine 105 may use a configuration from a user interface template for the ad unit 120 to determine a number of features to include in the feature subset. For example, if the user interface template indicates that the ad unit 120 can include up to four feature cards, the processing engine 105 may use the prioritized feature list to produce a feature subset that includes the top four features included in the prioritized feature list.

At 240, the processing engine 105 may generate the ad unit 120 using 360 spins included in the spin feed and the media objects included in the feature subset. The processing engine 105 may generate a file for the ad unit 120, such as a JavaScript Object Notation file, a comma separated value file, an extensible markup language file, and/or the like. The ad unit 120 may include, for example, a reference to a 360 spin and references to each of the image objects, video objects, and or the like associated with the feature subset.

The contents of the ad unit 120 may depend on the client configuration record, which may indicate that the ad unit generated for the client organization should include the 360 spins, the feature cards, or both. Based on the client configuration record, the processing engine 105 may generate the ad unit 120 with one or more 360 spins, one or more feature cards, or a combination thereof.

If the feed server 110 does not provide a spin feed for a product, the processing engine 105 may include, in the ad unit 120, a link and/or reference to a stock presentation for the 360 spin. The stock presentation may be provided by, for example, the product manufacturer, the feature objects server 115, and/or the like.

The processing engine 105 may include, in the ad unit 120, a user interface template to be used when the client device 112A displays the ad unit 120. The user interface template may include a screen layout for the ad unit 120, including a position and size for display element of the ad unit 120. For example, processing engine 105 may include, in the user interface template, a reference to user interface templates for 480×320 pixel displays, 970×250 pixel displays, 300×250 pixel displays, and/or the like. The ad re-targeting platform 130, the feed server 110, and/or the web server may decide which template to deliver to the client device 112A based on display capabilities received from the client device 112A, display preferences included in the inventory feed, display preferences included in the feature feed, display preferences included in the client configuration record, and/or the like. Alternatively and/or additionally, the viewer application at the client device 112A may determine which user interface template to use for the ad unit 120 based on device capabilities, screen size, consumer preferences, and/or the like.

At 245, the processing engine 105 may deliver the ad unit 120 along with the tracking information to the ad serving platform 130. The processing engine 105 may store the ad unit 120 and the tracking information on the ad unit server 125. The processing engine 105 may send a notification to the ad serving platform 130 indicating the ad unit 120 is available.

The ad serving platform 130 may receive, from the web server 108, tracking information associated with the client device 112A and/or the consumer. The ad serving platform 130 may compare the tracking information associated with the ad unit 120 with the tracking information received from the client device 112A. In response to determining that the received tracking information matches the tracking information associated with the ad unit 120, the ad serving platform 130 may send the ad unit 120 to the web server 108 to be included in the content that is sent to the client device 112A.

Figure 3:
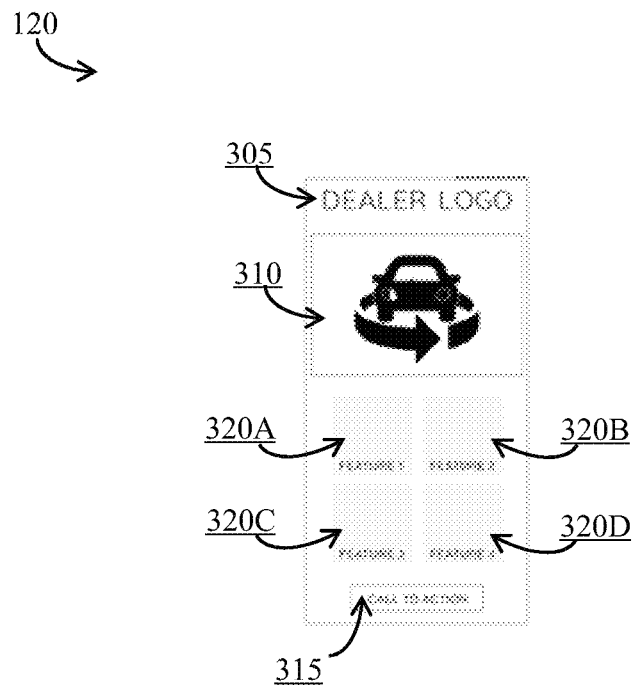
FIG. 3 depicts a rich media ad unit, in accordance with some example embodiments.

FIG. 3 depicts the rich media ad unit, such as the ad unit 120, in accordance with some example embodiments. The ad unit 120 may include a logo region 305, at least one spin region 310, a call to action region 315, one or more feature card regions 320A-D, and/or the like. When the client device 112A displays the ad unit 120, the 360 spin is displayed in the at least one spin region 310, and one feature card is displayed in each of the feature card regions 320A-D. Although the ad unit 120 depicted in the example of FIG. 3 has four feature cards 320A-D, the ad unit 120 may include any number of feature cards.

Figure 4:
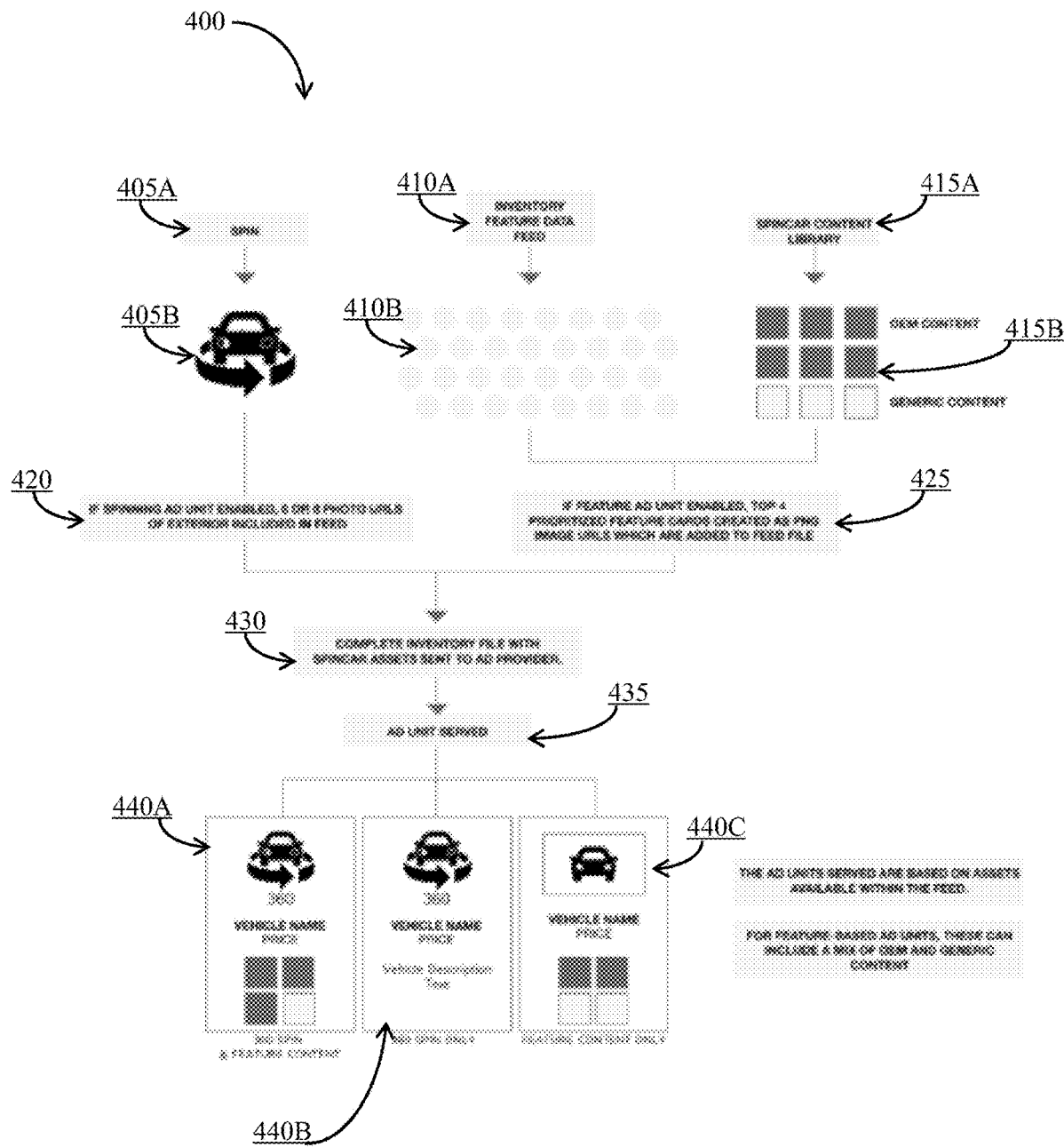
FIG. 4 depicts a flowchart illustrating another example of a process for generating a rich media ad unit, in accordance with some example embodiments.

FIG. 4 depicts a process 400 for generating a rich media ad unit, such as the ad unit 120, in accordance with some example embodiments.

At 405A-B, the processing engine 105 may receive a 360 spin from the feed server 110. The 360 spin may be included in the spin feed, as described above with respect to the example of Table 3.

At 410A-B, the processing engine 105 may receive the feature feed from the feed server 110. The feature feed may include a list of features associated with one or more products, as described above with respect to the example of Table 2.

At 415A-B, the processing engine 105 may receive a feature catalog from the feature objects server 115, as described above with respect to the example of Table 4. The feature catalog may be part of a content library 415A.

At 420, the processing engine 105 may determine, based on the client configuration record, whether 360 spins are enabled for the client organization, as described above with respect to FIG. 2. If 360 spins are disabled for the client organization, the processing engine 105 may exclude the 360 spin(s) from the ad unit 120.

At 425, the processing engine 105 may determine, based on the client configuration record, whether feature cards are enabled for the client organization. If feature cards are enabled for the client organization, the processing engine 105 may generate one or more feature cards as described above with respect to FIG. 2. If feature cards are disable for the client organization, the processing engine 105 may exclude the feature cards from the ad unit 120.

At 430, the processing engine 105 may generate the ad unit 120, as described above with respect to FIG. 2. The processing engine 105 may include the 360 spin(s) and/or one or more feature cards in the ad unit 120, and send the ad unit 120 to the ad serving platform 130.

At 435, the client device 112A may receive the ad unit 120 from the web server 108, the ad serving platform 130, the feed server 110, and/or the like. As described above, the ad unit 120 may include at least one 360 spin for the product. The ad unit 120 may also include a number of feature cards for the product.

At 440A, the client device 112A may display the ad unit 120, including the 360 spin and the feature cards. As noted above with respect to FIG. 2, the client device 112A may display the ad unit 120 according to the user interface template included in the ad unit 120.

At 440B, the client device 112A may display the ad unit 120, including only the 360 spin(s). This may be the case when feature cards are not enabled for the client organization, as described above with respect to FIG. 2.

At 440C, the client device 112A may display the ad unit 120 including a still image of the product and one or more feature cards. This may be the case when 360 spins are not enabled for the client organization, as described above with respect to FIG. 2.

Figure 5:
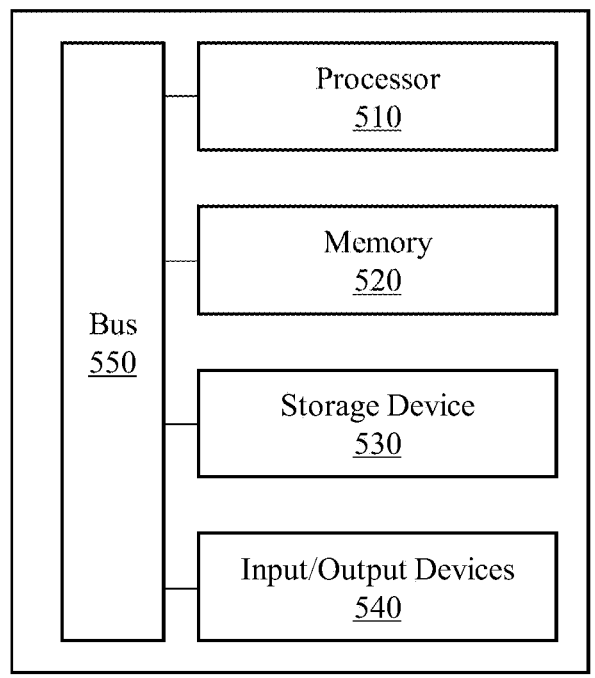
FIG. 5 depicts a block diagram illustrating a computing system, in accordance with some example embodiments.

FIG. 5 depicts a block diagram illustrating a computing system 500, in accordance with some example embodiments. Referring to FIGS. 1-4, the computing system 500 may be used to implement the processing engine 105, the web server 108, the feed server 110, the client devices 112A-112B, the feature objects server 115, the ad unit server 125, the ad serving platform 130, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the processing engine 105. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for the user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can include a flash drive, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) formats. Alternatively, the computing system 500 can be used to execute any type of software application. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively and/or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed:

1. An apparatus comprising:
   at least one processor; and
   at least one memory storing instructions which, when executed by the at least one processor, result in operations comprising:
   receiving, from a feed server via a communication network, an inventory feed and a feature feed, the inventory feed including a plurality of product identifiers, the feature feed including a plurality of features, each of the plurality of features being associated with at least one of the plurality of product identifiers;
   receiving, from the feed server via the communication network, a spin feed including a plurality of 360 spins, each of the plurality of 360 spins being associated with at least one of the plurality of product identifiers included in the inventory feed;
   selecting, based on consumer metrics, a product identifier from the plurality of product identifiers;
   generating, based on the consumer metrics, a feature subset including a subset of the plurality of features associated with the product identifier;
   selecting, based on the spin feed and the product identifier, a 360 spin to include in a rich media ad unit;
   generating, based on the feature subset, the rich media ad unit; and
   transmitting, in response to the selecting the 360 spin, the rich media ad unit, received from an ad serving platform, for displaying on a user interface, the rich media ad unit including a spin region and a feature region, the displaying comprising displaying the selected 360 spin in the spin region and a feature of the feature subset in the feature region.

2. The apparatus of claim 1, wherein the operations further comprise delivering the rich media ad unit to an ad serving platform.

3. The apparatus of claim 1, wherein the inventory feed and the feature feed are received in a common feed or as separate feeds.

4. The apparatus of claim 1, wherein generating the rich media ad unit comprises including, in the rich media ad unit, a 360 spin and/or one or more feature cards, each of the one or more feature cards including a reference to an associated media object, the associated media object including a still image, a video, and/or a textual description of at least one feature included in the feature subset.

5. The apparatus of claim 1, wherein the displaying comprises displaying the feature region inferior to the spin region on the user interface.

6. The apparatus of claim 1, wherein selecting the product identifier further comprises:
   producing, based on the inventory feed, a set of candidate product identifiers;
   obtaining, based on the set of candidate product identifiers, a plurality of candidate features;
   determining that at least one of the plurality of candidate features matches a feature indicated by the consumer metrics; and
   selecting, in response to the determining, the product identifier from the set of candidate product identifiers.

7. The apparatus of claim 1, wherein selecting the product identifier further comprises:
   obtaining a product category associated with each of the plurality of product identifiers;
   determining that the product category matches a product category indicated by the consumer metrics; and
   selecting, in response to the determining, the product identifier from the plurality of product identifiers.

8. The apparatus of claim 7, wherein the plurality of product identifiers comprises a plurality of vehicle identification numbers, and wherein obtaining a product category associated with each of the plurality of product identifiers comprises determining, based on a vehicle identification number from the plurality of vehicle identification numbers, a year, make, model, and/or vehicle type associated with the vehicle identification number.

9. The apparatus of claim 1, wherein the operations further comprise:
   receiving a feature catalog including a plurality of features, each of the plurality of features being associated with at least one of the plurality of product identifiers;
   searching, based on the consumer metrics, the feature catalog to generate a candidate feature list; and
   prioritizing, based on the consumer metrics, the candidate feature list to generate a prioritized feature list, wherein generating the feature subset comprises selecting, from the prioritized feature list, the subset of the plurality of features associated with the product identifier.

10. The apparatus of claim 1, wherein the rich media ad unit further includes a user interface template including a pixel width of the rich media ad unit, a pixel height of the rich media ad unit, and a layout, the layout including an indication of a logo region, an indication of a spin region, and/or one or more indications of feature card regions.

11. The apparatus of claim 4, wherein generating the rich media ad unit further comprises:

in response to determining, based on a client configuration record, that 360 spins are disabled, excluding the 360 spin from the rich media ad unit.

12. The apparatus of claim 4, wherein generating the rich media ad unit further comprises:
in response to determining, based on a client configuration record, that feature cards are disabled, excluding the one or more feature cards from the rich media ad unit.

13. A method comprising:
receiving, by a processing engine, from a feed server via a communication network, an inventory feed and a feature feed, the inventory feed including a plurality of product identifiers, the feature feed including a plurality of features, each of the plurality of features being associated with at least one of the plurality of product identifiers;
receiving, by the processing engine, from the feed server via the communication network, a spin feed including a plurality of 360 spins, each of the plurality of 360 spins being associated with at least one of the plurality of product identifiers included in the inventory feed;
selecting, by the processing engine and based on consumer metrics, a product identifier from the plurality of product identifiers;
generating, by the processing engine and based on the consumer metrics, a feature subset including a subset of the plurality of features associated with the product identifier;
selecting, by the processing engine and based on the spin feed, the 360 spin included in a rich media ad unit;
generating, by the processing engine and based on the feature subset, the rich media ad unit; and
transmitting, by the processing engine and in response to the selecting the 360 spin, the rich media ad unit, received from an ad serving platform, for displaying on a user interface, the rich media ad unit including a spin region and a feature region, the displaying comprising displaying the selected 360 spin in the spin region and a feature of the feature subset in the feature region.

14. The method of claim 13, further comprising:
delivering, by the processing engine, the rich media ad unit to an ad serving platform.

15. The method of claim 13, wherein generating the rich media ad unit comprises including, in the rich media ad unit, a 360 spin and/or one or more feature cards, each of the one or more feature cards including a reference to an associated media object, the associated media object including a still image, a video, and/or a textual description of at least one feature included in the feature subset.

16. The method of claim 13 wherein the displaying comprises displaying the feature region inferior to the spin region on the user interface.

17. The method of claim 13, wherein selecting the product identifier further comprises:
producing, by the processing engine and based on the inventory feed, a set of candidate product identifiers;
obtaining, by the processing engine and based on the set of candidate product identifiers, a plurality of candidate features;
determining, by the processing engine, that at least one of the plurality of candidate features matches a feature indicated by the consumer metrics; and
selecting, by the processing engine and in response to the determining, the product identifier from the set of candidate product identifiers.

18. The method of claim 13, wherein selecting the product identifier further comprises:
obtaining, by the processing engine, a product category associated with each of the plurality of product identifiers;
determining, by the processing engine, that the product category matches a product category indicated by the consumer metrics; and
selecting, by the processing engine and in response to the determining, the product identifier from the plurality of product identifiers.

19. The method of claim 18, wherein the plurality of product identifiers comprises a plurality of vehicle identification numbers, and wherein obtaining a product category associated with each of the plurality of product identifiers comprises determining, based on a vehicle identification number from the plurality of vehicle identification numbers, a year, make, model, and/or vehicle type associated with the vehicle identification number.

20. The method of claim 13, further comprising:
receiving, at the processing engine, a feature catalog including a plurality of features, each of the plurality of features being associated with at least one of the plurality of product identifiers;
searching, by the processing engine and based on the consumer metrics, the feature catalog to generate a candidate feature list; and
prioritizing, by the processing engine and based on the consumer metrics, the candidate feature list to generate a prioritized feature list, wherein generating the feature subset comprises selecting, from the prioritized feature list, the subset of the plurality of features associated with the product identifier.

* * * * *